(12) United States Patent
Nagai et al.

(10) Patent No.: US 6,672,765 B2
(45) Date of Patent: Jan. 6, 2004

(54) DIRECT DRIVE BEARING MECHANISM

(75) Inventors: Shigekazu Nagai, Adachi-ku (JP); Akio Saitoh, Kawaguchi (JP); Koji Sugano, Koshigaya (JP); Masaru Saitoh, Tsukuba-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/135,712

(22) Filed: May 1, 2002

(65) Prior Publication Data
US 2002/0164095 A1 Nov. 7, 2002

(30) Foreign Application Priority Data
May 7, 2001 (JP) .......................................... 2001-136615

(51) Int. Cl.[7] .............................................. F16C 29/04
(52) U.S. Cl. ....................................................... 384/49
(58) Field of Search .......................... 384/49, 445, 513, 384/516

(56) References Cited

U.S. PATENT DOCUMENTS 5,145,262 A * 9/1992 Morita .......................... 384/49
RE34,774 E * 11/1994 Kamimura .................... 384/49

OTHER PUBLICATIONS

Copending U.S. patent application No. 10/449,535 filed on Jun. 2, 2003 by Shigekazu Nagai et al.

* cited by examiner

Primary Examiner—Lenard A. Footland
(74) Attorney, Agent, or Firm—Paul A. Guss (57) ABSTRACT

A direct drive bearing mechanism comprises guide plates which are installed to retaining recesses of a guide block and each of which has a plurality of hemispherical dimples, race members which are installed to a guide rail and each of which has a groove having a circular arc-shaped cross section, and a plurality of balls each of which rotates in each of the dimples and which slide along the grooves so that the balls do not circulate.

9 Claims, 15 Drawing Sheets

DIRECT DRIVE BEARING MECHANISM

BACKGROUND OF THE INVENTION

1. Field of the Invention

The present invention relates to a direct drive bearing mechanism capable of appropriately supporting a linearly displaceable (operable) member.

2. Description of the Related Art

A guide mechanism, which smoothly supports a slider for reciprocating in the axial direction of an actuator body, has been provided for a linear actuator and so on.

Figure 15:
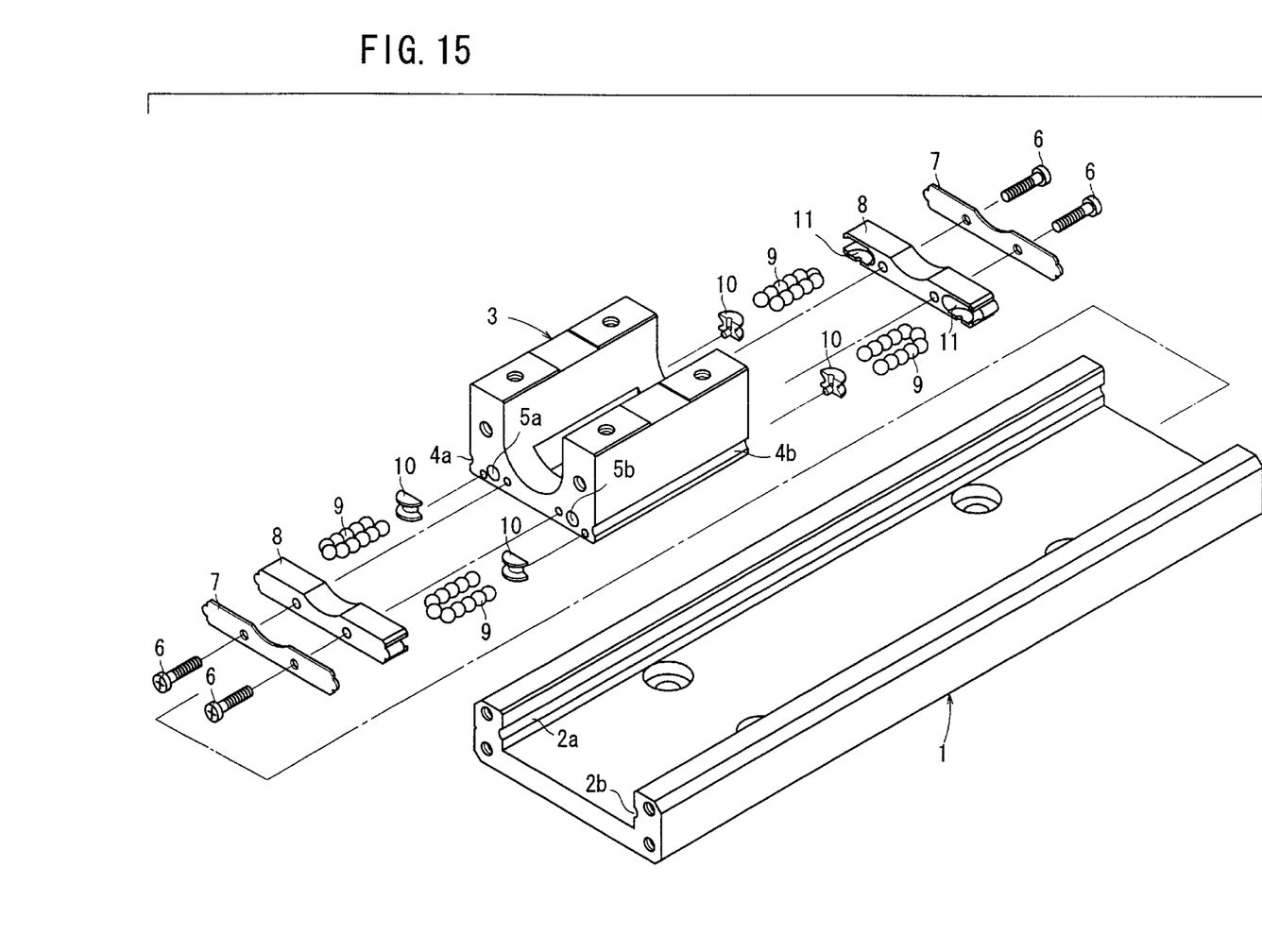
FIG. 15 is an exploded perspective view of a conventional guide mechanism.

As shown in FIG. 15, the guide mechanism includes a pair of opposing first ball-rolling grooves 2a, 2b which extend axially on inner wall surfaces of a recess of a frame 1 and each of which has a vertical cross section of a circular arc shape, a pair of second ball-rolling grooves 4a, 4b which are formed on side surfaces of the slider 3 opposed to the inner wall surfaces of the frame 1 and each of which has a vertical cross section of a circular arc shape, and a pair of ball-circulating rolling holes 5a, 5b which are disposed near the second ball-rolling grooves 4a, 4b and which penetrate through the slider 3 in the axial direction of the slider 3.

The guide mechanism further includes plates 7 and covers 8 which are integrally connected to lower portions of end surfaces of the slider 3 by screw members 6, and return guides 10 which are installed to the end surfaces of the slider 3 to change the rolling direction of balls 9. Ball return grooves 11 are formed on the covers 8. Endless circulating tracks, in which the plurality of balls 9 roll and circulate, are constructed by the mutually opposing first and second ball-rolling grooves 2a, 2b, 4a, 4b, the penetrating ball-circulating rolling holes 5a, 5b formed through the slider 3, and the ball return grooves 11.

In the conventional guide mechanism, the plurality of balls 9 roll and circulate along the endless circulating tracks. Consequently, the slider 3 is smoothly guided in the axial direction of the frame 1.

However, in the conventional guide mechanism, the number of parts is increased because it is necessary to prepare the plurality of members such as the return guides 10 and the covers 8. Further, it is necessary to perform the boring machining for forming the ball-circulating rolling holes 5a, 5b for circulating the plurality of returned balls 9. Therefore, in the technical field to which the guide mechanism is applied, it has been demanded that the number of parts is reduced to simplify the assembling operation, and the machining steps are curtailed as far as possible to decrease the production cost.

SUMMARY OF THE INVENTION

A general object of the present invention is to provide a direct drive bearing mechanism which reduces the number of parts and simplifies the assembling operation by adopting a non-circulating system for balls.

A principal object of the present invention is to provide a direct drive bearing mechanism which curtails the machining steps and further reduces the production cost.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
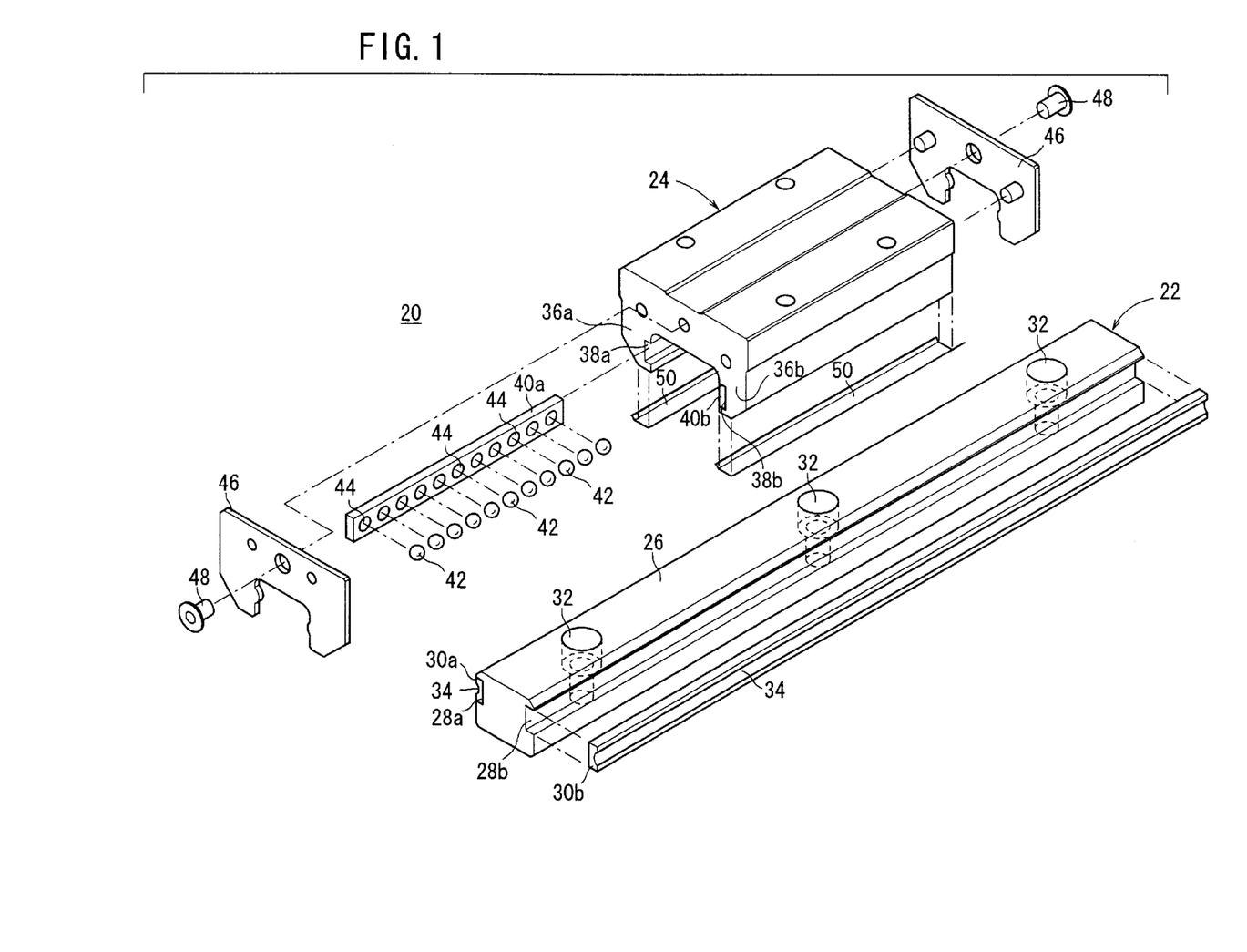
FIG. 1 is an exploded perspective view of a linear guide according to an embodiment of the present invention.

With reference to FIG. 1, reference numeral 20 indicates a linear guide according to an embodiment of the present invention.

The linear guide 20 comprises a lengthy guide rail 22, and a guide block 24 which is displaceable along the guide rail 22.

The guide rail 22 includes a rail body 26 which has a substantially rectangular cross section, and a pair of race members 30a, 30b which are provided on mutually opposing both side surfaces of the rail body 26 respectively and which are installed in a pair of long grooves 28a, 28b.

It is preferable that each of the rail body 26 and the guide block 24 is formed of, for example, a resin material or a metal material such as aluminum or brass, each of the race members 30a, 30b is formed of a metal material capable of hardening, and a surface-hardening treatment is applied by means of, for example, shot peening. The race members 30a, 30b are retained in the long grooves 28a, 28b of the rail body 26 by a method such as forcible insertion, adhesion, or welding using a laser beam or the like.

The rail body 26 has a plurality of fixing holes 32 which are separated from each other by predetermined spacing distances in order to fix the rail body 26 to unillustrated another member. A groove 34, which extends in the longitudinal direction and which has a substantially circular arc-shaped cross section, is formed on each of the race members 30a, 30b (see FIG. 2). The race members 30a, 30b, on which the grooves 34 are formed in advance, may be installed to the long grooves 28a, 28b of the rail body 26. Alternatively, the race members 30a, 30b may be installed to long grooves 28a, 28b of the rail body 26, and then the race members 30a, 30b may be subjected to groove-forming machining to form the grooves 34 on the race members 30a, 30b.

A pair of retaining recesses 38a, 38b, which are opposed to one another and which extend in the axial direction, are formed on inner wall surfaces of side sections 36a, 36b of the guide block 24. Flat plate-shaped guide plates 40a, 40b are retained in the retaining recesses 38a, 38b respectively. A plurality of hemispherical dimples 44, each of which has a spherical diameter corresponding to the diameter of balls (steel balls) 42, are arranged linearly on one side surface of the guide plate 40a, 40b. The dimples 44 are spaced from each other by predetermined distances.

Scrapers 46 are installed to both axial end surfaces of the guide block 24 by screw members 48 respectively. Side seals 50, which remove dust or the like, are installed to lower portions of the guide block 24 by unillustrated screw members (see FIG. 2).

Figure 2:
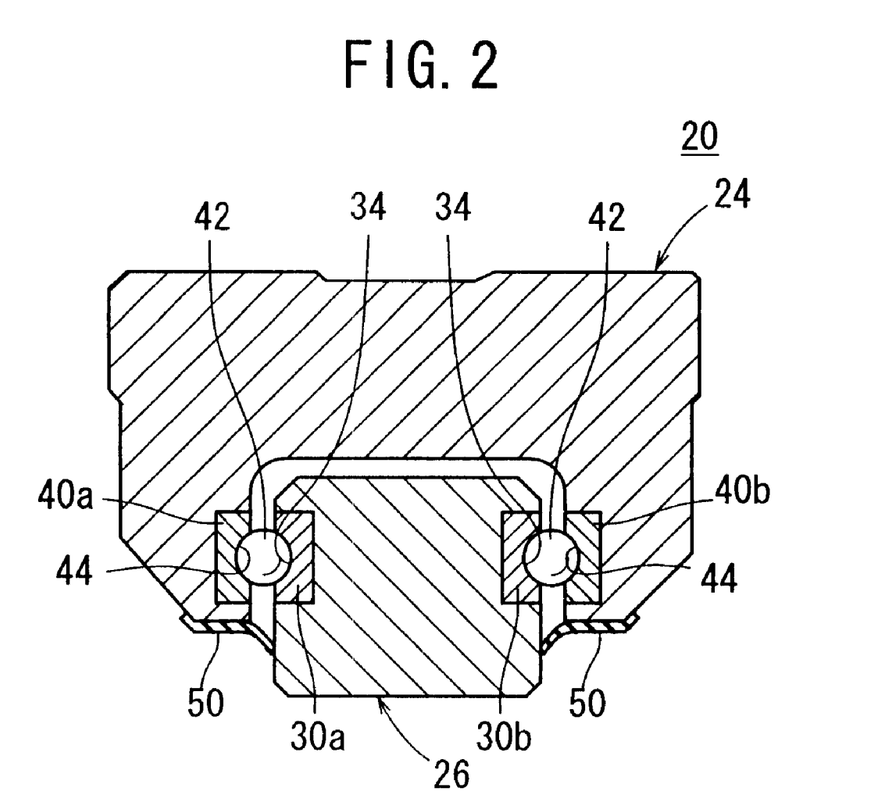
FIG. 2 is a vertical sectional view taken in a direction substantially perpendicular to the axis of the linear guide shown in FIG. 1.

It is preferable that each of the guide plates 40a, 40b is formed of, for example, a resin material or a metal material such as aluminum or brass, and each of the side seals 50 is formed of a flexible material such as rubber or synthetic resin.

The linear guide 20 according to the embodiment of the present invention is basically thus constructed. Its function and effect will now be explained.

When the guide block 24 is displaced linearly along the guide rail 22, the plurality of balls 42 interposed between the guide block 24 and the guide rail 22 roll, i.e., rotate respectively in the plurality of dimples 44 formed on the guide plates 40a, 40b. Further, the plurality of balls 42 slide along grooves 34 of the race members 30a, 30b installed to the rail body 26.

In other words, the plurality of balls 42 do not circulate while rolling. The plurality of balls 42 rotate in the respective dimples 44 of the guide plates 40a, 40b, and they slide along the grooves 34 of the race members 30a, 30b.

When a load is applied to the guide block 24 by an unillustrated workpiece or the like, then the balls 42 make surface-to-surface contact with the inner wall surfaces of the dimples 44 on the side of the dimples 44, the contact area is increased, and the stress per unit area is decreased. As a result, the rolling resistance is decreased for the dimples 44. On the other hand, as for the race members 30a, 30b, the contact area between the balls 42 and the inner wall surfaces of the grooves 34 is decreased, and the stress per unit area is increased. As a result, the rolling resistance is increased on the side of the race members 30a, 30b.

As described above, the embodiment of the present invention resides in the non-circulating system in which the balls 42 roll and slide substantially simultaneously. Accordingly, the frictional resistance can be mitigated, and the allowable load can be large, as compared with the conventional guide mechanism in which a plurality of balls 9 roll along the endless circulating tracks (see FIG. 15).

In the embodiment of the present invention, it is unnecessary to form the ball-circulating rolling holes 5a, 5b of the conventional guide mechanism. Therefore, it is possible to simplify the machining steps and reduce the production cost. Further, it is unnecessary to provide any space for the ball-circulating rolling grooves 5a, 5b. Therefore, it is possible to realize a compact size and a light weight.

In the embodiment of the present invention, the allowable surface pressure for the balls 42 is increased owing to the dimples 44 each having a radius of curvature closely similar to the spherical one. Further, the applied stress is decreased as well in view of the known Hertz's expression. Therefore, it is unnecessary to perform any treatment to enhance the material strength.

In the embodiment of the present invention, it is unnecessary to provide the return guide 10 and the cover 8 of the conventional guide mechanism. The number of parts can be reduced, and the production cost can be further decreased.

In the embodiment of the present invention, the non-circulating system for the balls 42 is adopted, and hence the balls 42 do not roll along any endless circulating track. Therefore, the sound, which would be otherwise generated when the balls 42 roll, can be eliminated, and it is possible to maintain quietness. Conventionally, any contact sound caused by the contact of the balls 9 with the return guide 10 or the like may be generated when the balls 9 are migrated from the linear track of the endless circulating track to the curved track for returning the balls 9. In the embodiment of the present invention, such contact sound is not generated.

Conventionally, the load points for the balls 9 are repeatedly moved to generate any fatigue failure, because the balls 9 roll along the endless circulating tracks. On the contrary, in the embodiment of the present invention, the non-circulating system is adopted, in which the balls 42 rotate in the dimples 44. Accordingly, the load is always applied to identical portions. Therefore, it is possible to further improve the durability. In other words, conventionally, the load points are periodically varied when the balls 9 roll, and the fatigue failure tends to appear. On the contrary, in the embodiment of the present invention, the load points are not periodically varied at all. Therefore, it is possible to suppress the fatigue failure.

Figure 3:
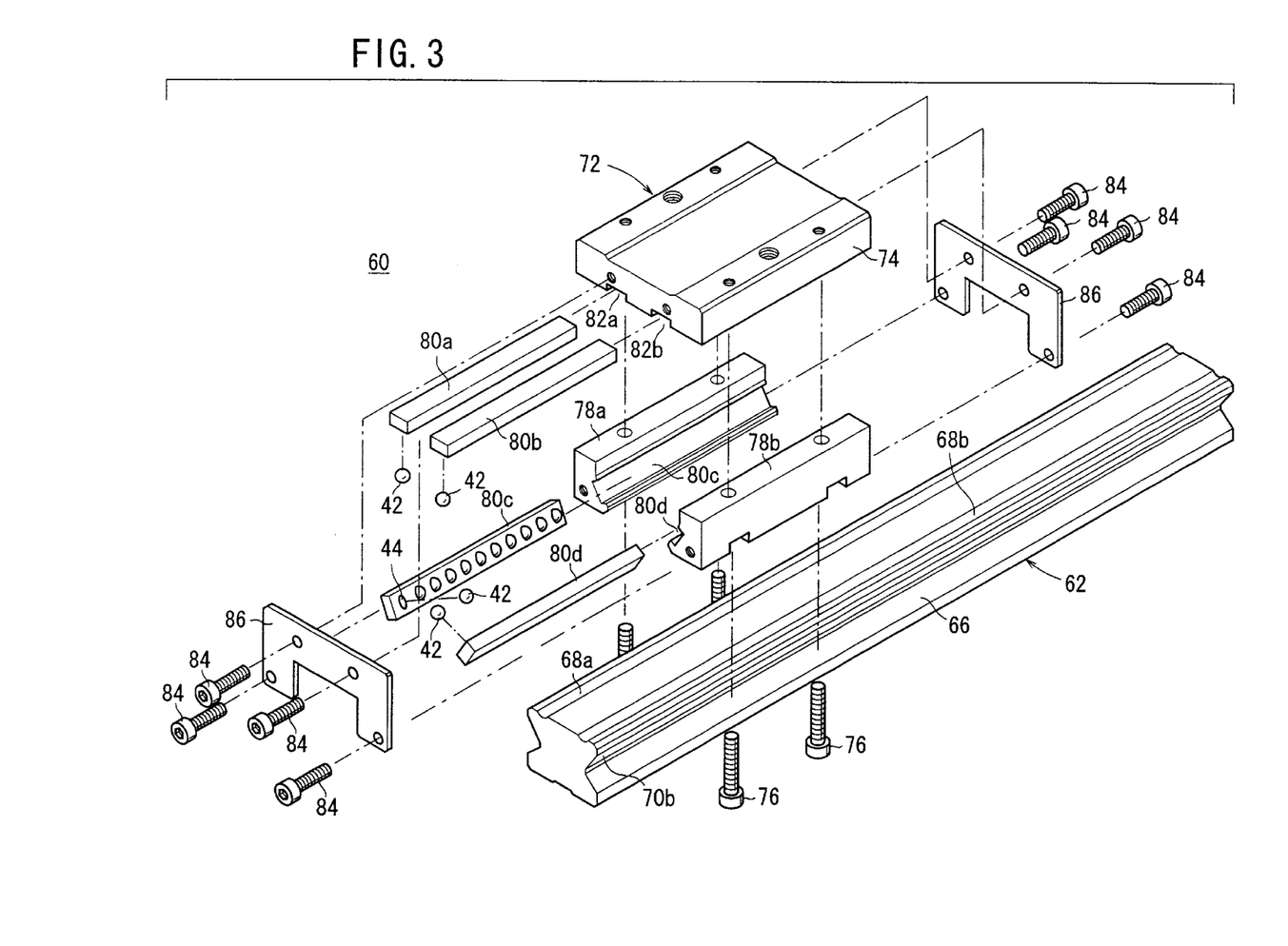
FIG. 3 is an exploded perspective view of a linear guide according to another embodiment of the present invention.
Figure 4:
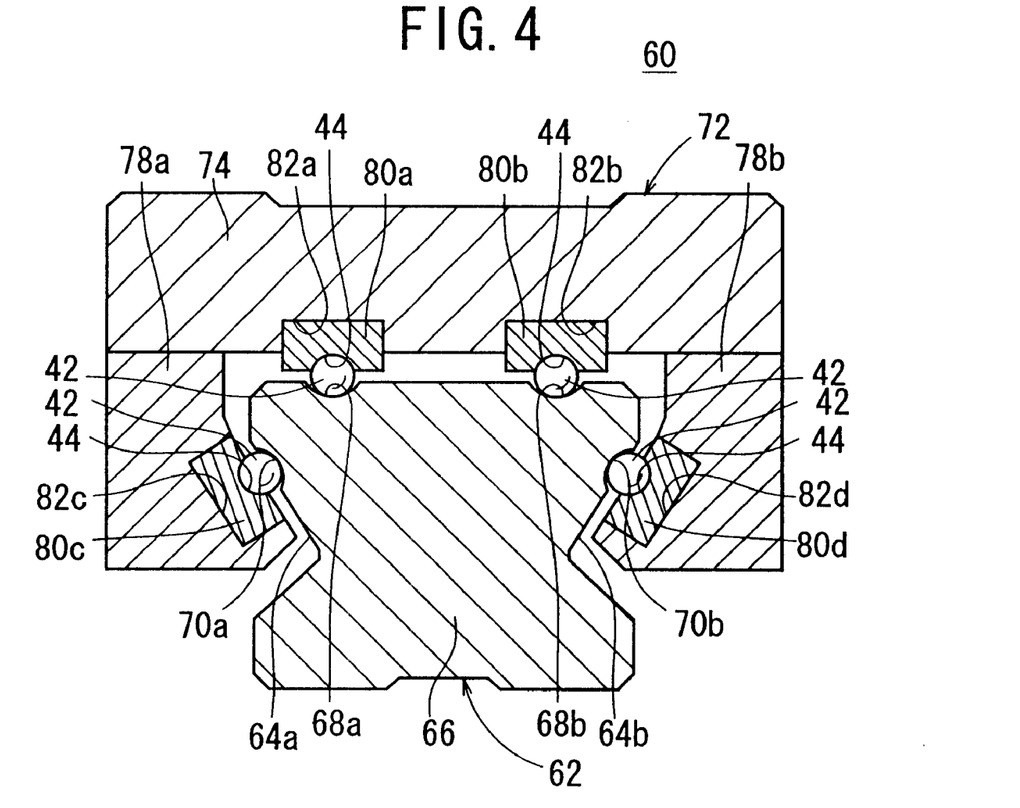
FIG. 4 is a vertical sectional view taken in a direction substantially perpendicular to the axis of the linear guide shown in FIG. 3.
Figure 5:
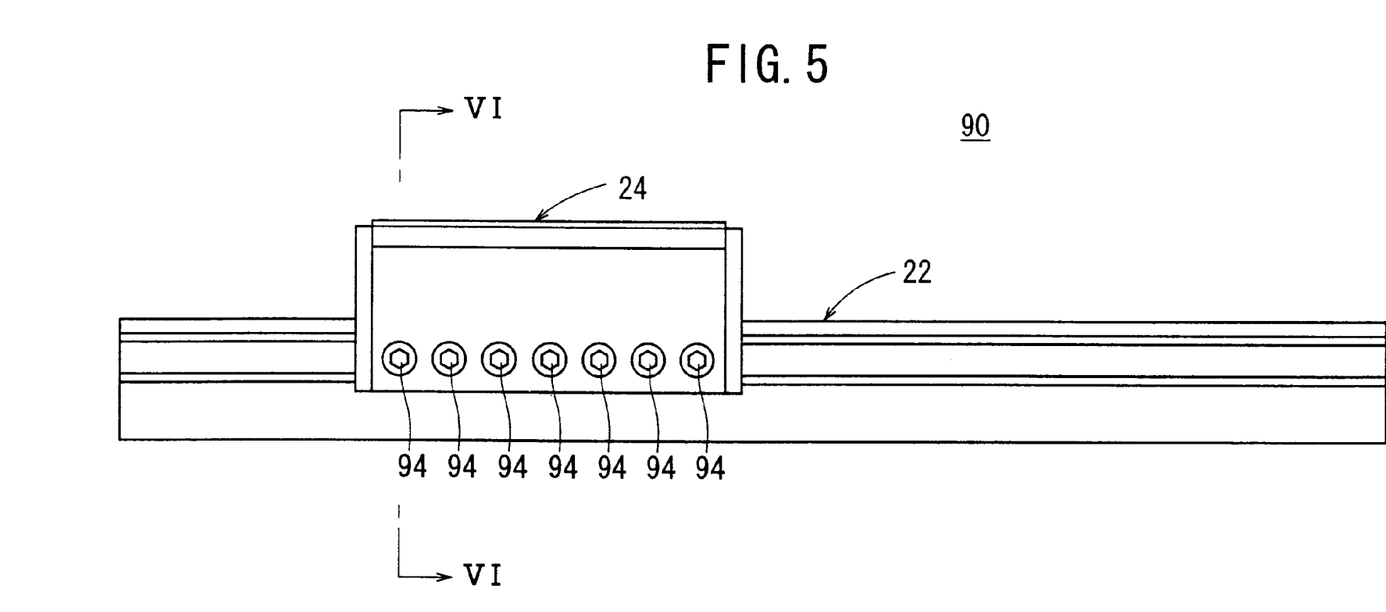
FIG. 5 is a side view of a linear guide according to still another embodiment of the present invention.
Figure 6:
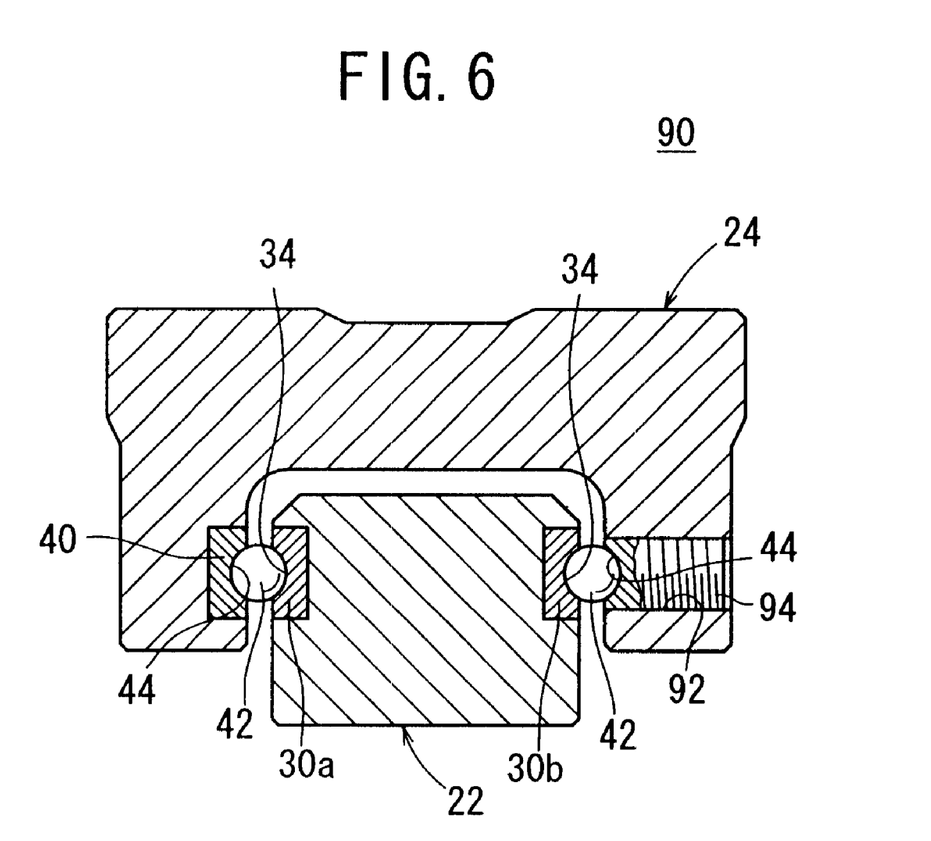
FIG. 6 is a vertical sectional view taken along a line VI—VI shown in FIG. 5.

A linear guide 60 according to another embodiment is shown in FIGS. 3 and 4. In the following description, the same constitutive components as those of the linear guide 20 shown in FIG. 1 are designated by the same reference numerals, detailed explanation of which will be omitted.

A guide rail 62 is composed of a rail body 66 which has mutually opposing both side sections cut out in V-grooved configurations to form inclined surfaces 64a, 64b thereon (see FIG. 4). A pair of first grooves 68a, 68b, each of which has a circular arc-shaped cross section, are formed substantially in parallel to one another on upper surface portions of the rail body 66. Second grooves 70a, 70b, each of which has a circular arc-shaped cross section, are formed axially on the side inclined surfaces 64a, 64b disposed closely to the first grooves 68a, 68b.

A guide block 72 comprises an upper block 74, and a pair of side blocks 78a, 78b which are connected to the upper block 74 by screw members 76. Retaining recesses 82a, 82b for retaining a pair of guide plates 80a, 80b are formed on the lower surface of the upper block 74 so that the retaining recesses 82a, 82b are separated from each other by a predetermined spacing distance and they are substantially in parallel to one another. Retaining recesses 82c, 82d for retaining guide plates 80c, 80d opposed to the inclined surfaces 64a, 64b are formed on the side blocks 78a, 78b.

The guide plates 80a to 80d are constructed in the same manner respectively, in which a plurality of dimples 44 are axially arranged. Scrapers 86 are installed to both end surfaces of the guide block 72 respectively by screw members 84.

In the linear guide 60, the pair of guide plates 80a, 80b are arranged substantially horizontally for the upper surface of the guide rail 62, and another pair of guide plates 80c, 80d are arranged along the inclined surfaces 64a, 64b on the side sections of the guide rail 62. That is, the four guide rails 80a to 80d are arranged in total. Accordingly, it is possible to appropriately support the load applied obliquely to the guide block 72.

In FIGS. 3 and 4, the first grooves 68a, 68b and the second grooves 70a, 70b are directly formed on the rail body 66. Alternatively, race members 30a, 30b as shown in FIGS. 1 and 2 may be installed to the rail body 66 without directly forming the first grooves 68a, 68b and the second grooves 70a, 70b on the rail body 66.

A linear guide 90 according to still another embodiment is shown in FIGS. 5 to 8.

In the linear guide 90, a guide plate 40, in which balls 42 are inserted into dimples 44, is arranged for one of the spaces between sides of a guide block 24 and a guide rail 22, and a plurality of screw members 94, which are screwed into screw holes 92 formed through the side of the guide block 24, are provided for the other space. A hemispherical dimple 44, which corresponds to the spherical surface of the ball 42, is formed on one end surface of each of the screw members 94 (see FIG. 7).

Figure 7:
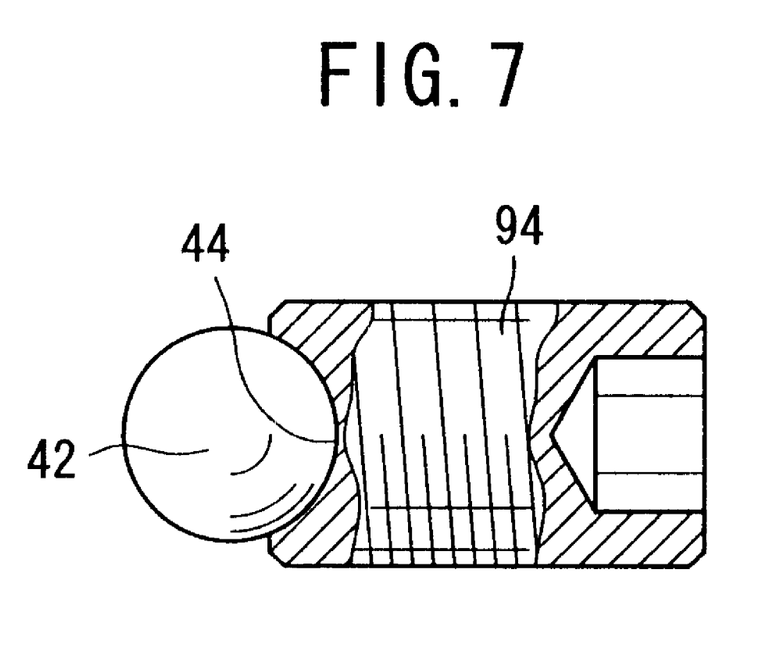
FIG. 7 is a partially magnified vertical sectional view FIG. 6.

The gap between the screw member 94 and the ball 42 is easily managed by adjusting the screwing amount of the screw member 94. Further, the dimple 44, which is automatically aligned for seating, is formed on the end surface of the screw member 94, and thus it is possible to absorb any attachment error.

Further, it is unnecessary to strictly afford the dimensional accuracy for the guide block 24 and the guide rail 22, because the gap can be managed by the screwing amount of the screw member 94. Thus, it is possible to perform the machining with ease.

Figure 8:
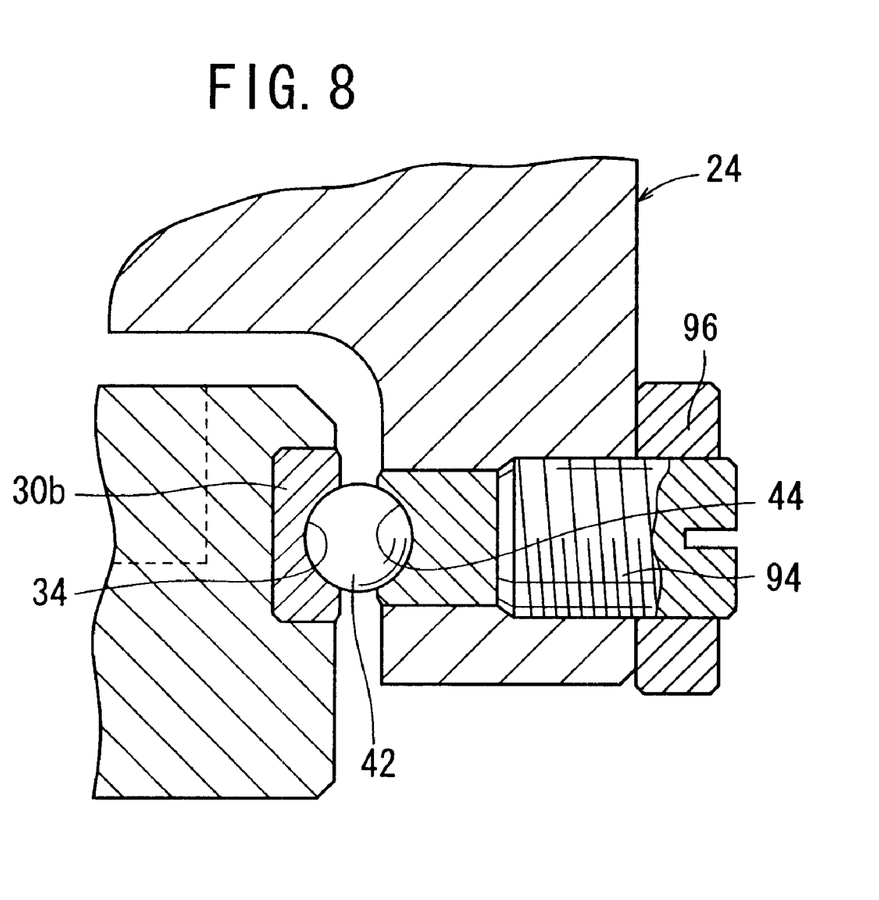
FIG. 8 is, with partial omission, a vertical sectional view of an illustrative modified embodiment of the linear guide shown in FIG. 5.

As shown in FIG. 8, the screw member 94 may be fixed by a lock nut 96.

Figure 9:
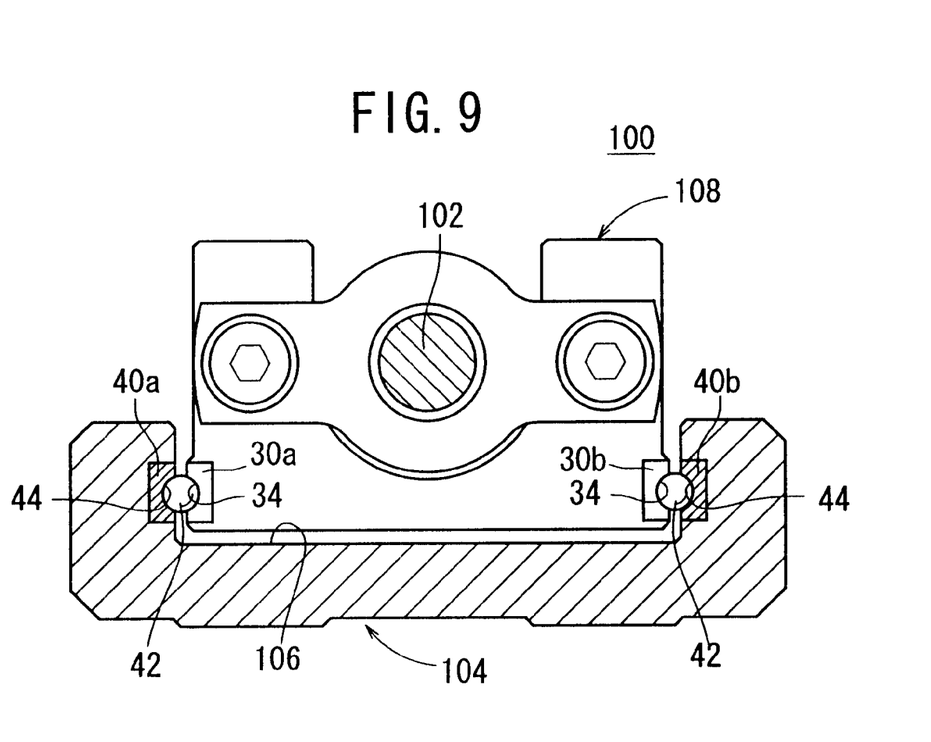
FIG. 9 is a partial vertical sectional view of an actuator according to an embodiment of the present invention.

FIG. 9 is a partial vertical sectional view of an actuator 100 to which the linear guide 20 according to the embodiment of the present invention is applied. The actuator 100 includes a slider 108. The slider 108 is displaceable along the inner wall surface of a recess 106 of a frame 104 under the rotary action of a ball screw shaft 102. Guide plates 40a, 40b and race members 30a, 30b are arranged and opposed to one another between the side surfaces of the slider 108 and the inner wall surface of the recess 106 of the frame 104. Balls 42 are engaged in dimples 44 which are formed for the guide plates 40a, 40b.

Figure 10:
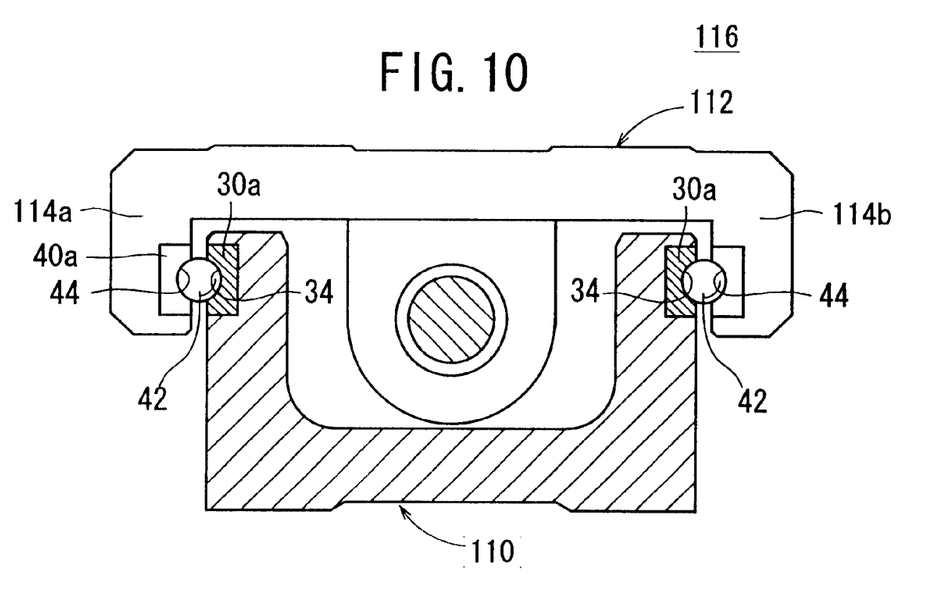
FIG. 10 is a partial vertical sectional view of an actuator according to another embodiment of the present invention.

As shown in FIG. 10, an actuator 116 may be constructed, in which the linear guide 20 is applied between outer side surfaces of a frame 110 and inner wall surfaces of side sections 114a, 114b of a slider 112.

As shown in FIGS. 11 to 14, when the present invention is applied to a feed screw shaft mechanism, the feed screw shaft mechanism 120 of the non-circulating type is constructed. A plurality of screw holes 124a to 124h, which are separated from each other by predetermined angles in the circumferential direction of a feed screw nut 122, may be formed linearly. A plurality of balls 42 may be supported respectively by a plurality of screw members 126 which are screwed into the screw holes 124a to 124h (see FIGS. 11 and 12).

Figure 11:
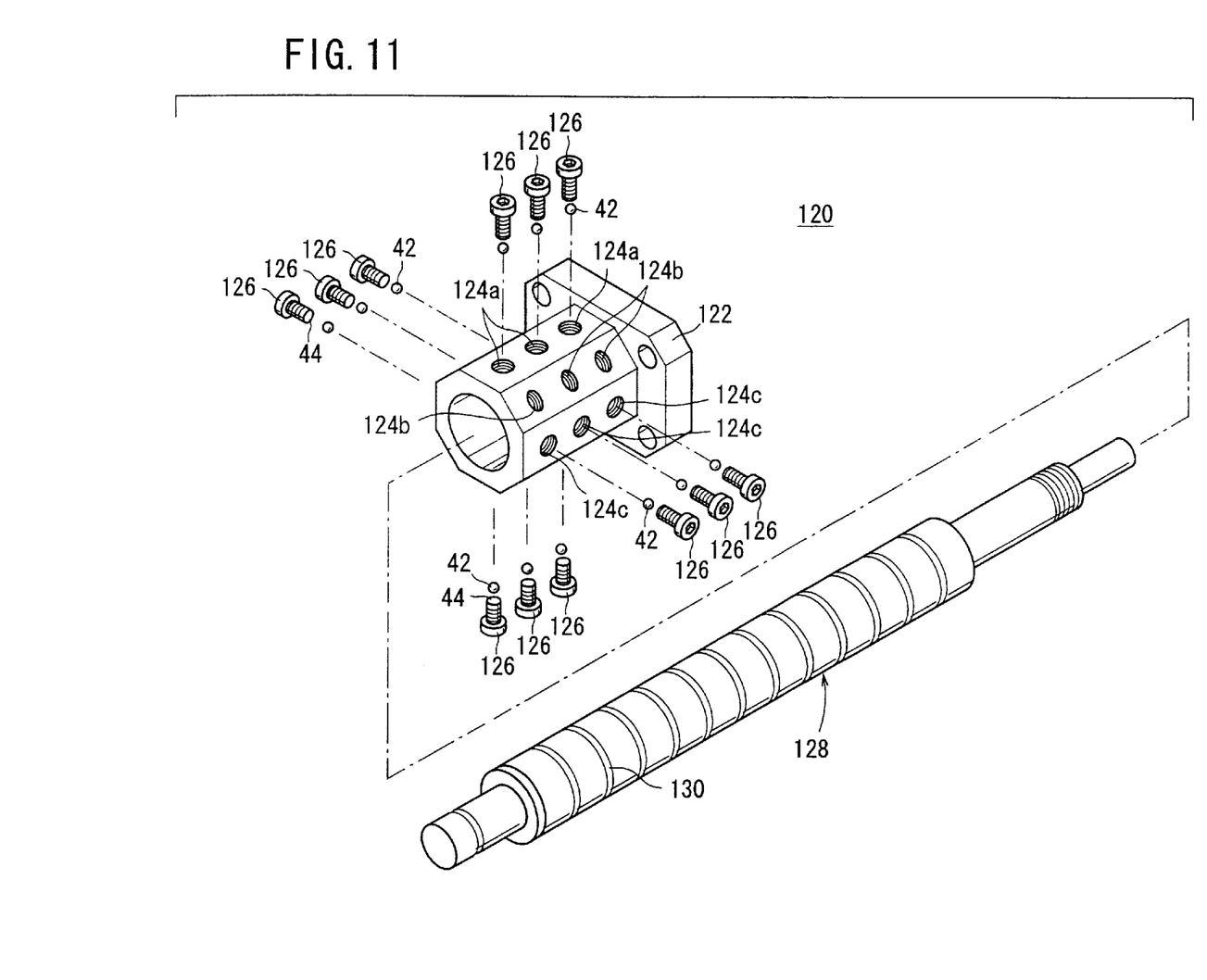
FIG. 11 is an exploded perspective view of a case in which the linear guide shown in FIG. 7 is applied to a feed screw mechanism.
Figure 12:
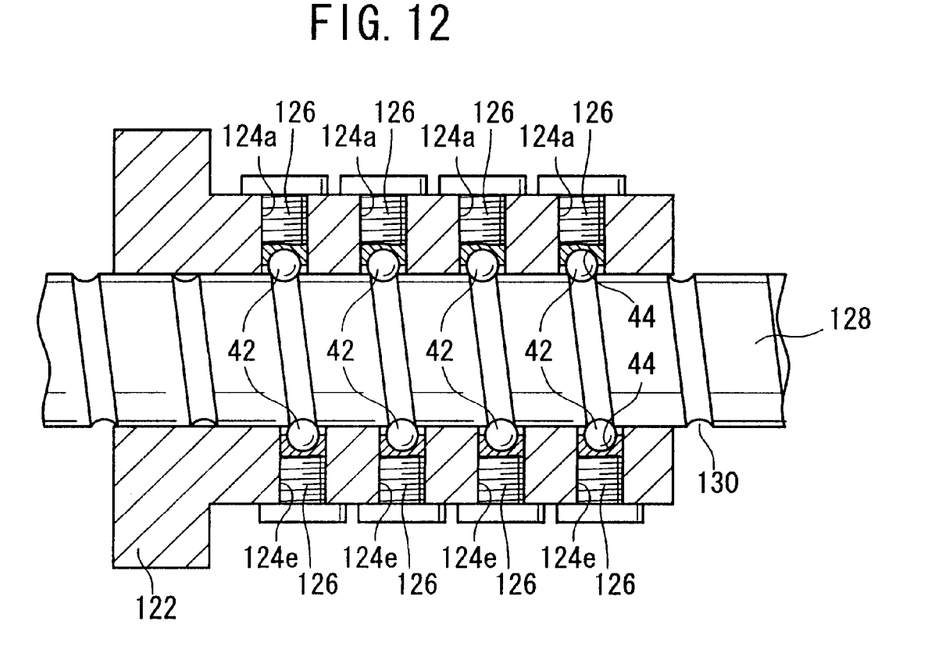
FIG. 12 is, with partial omission, a vertical sectional view taking in the axial direction of FIG. 11.

A dimple 44, which corresponds to the spherical surface of the ball 42, is formed at the forward end of the screw member 126. The ball 42 rotates in the dimple 44 on the side of the screw member 126. The ball 42 slides along a screw groove 130 formed on a feed screw shaft 128.

Figure 13:
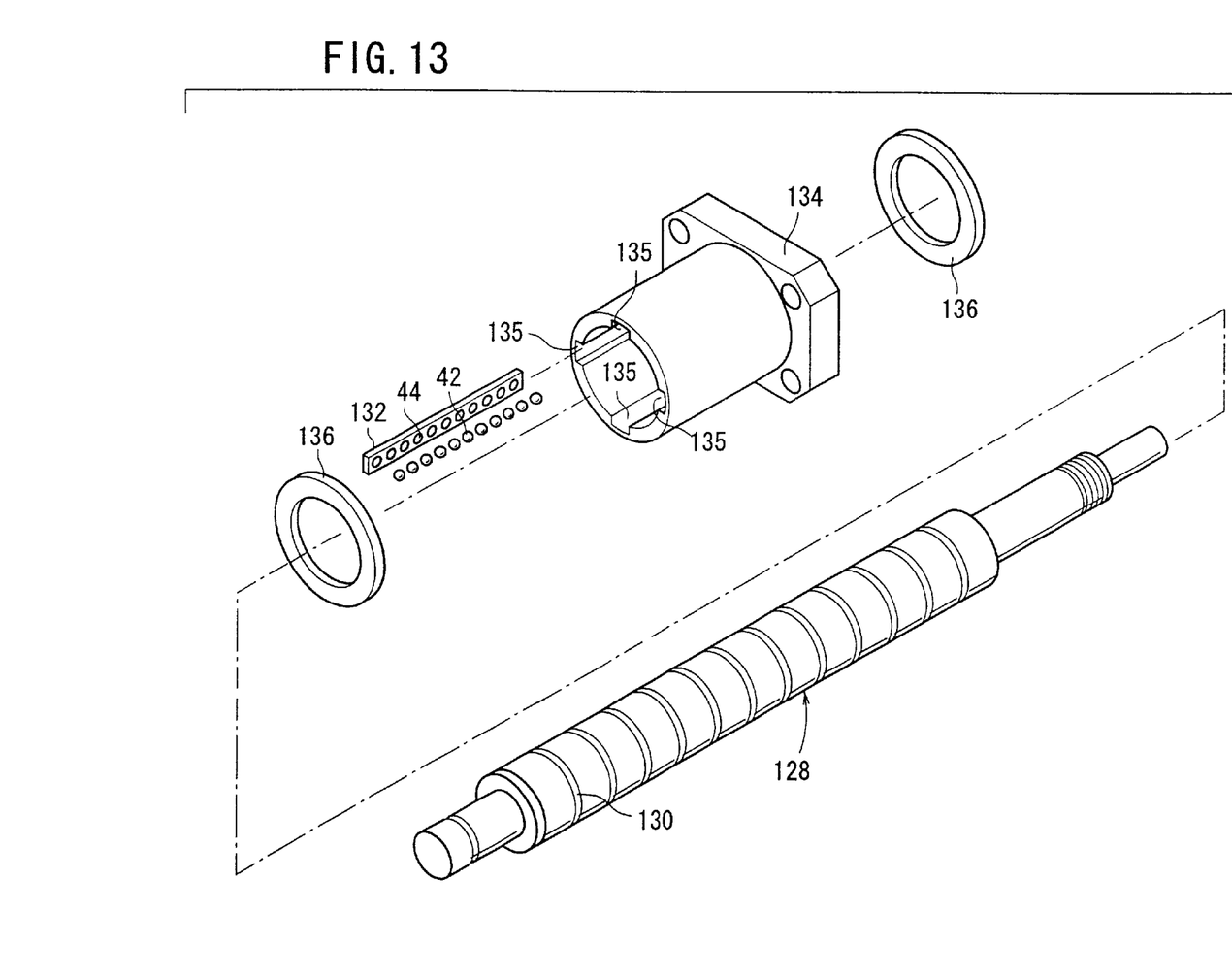
FIG. 13 is an exploded perspective view of a case in which the linear guide shown in FIG. 1 is applied to a feed screw mechanism.
Figure 14:
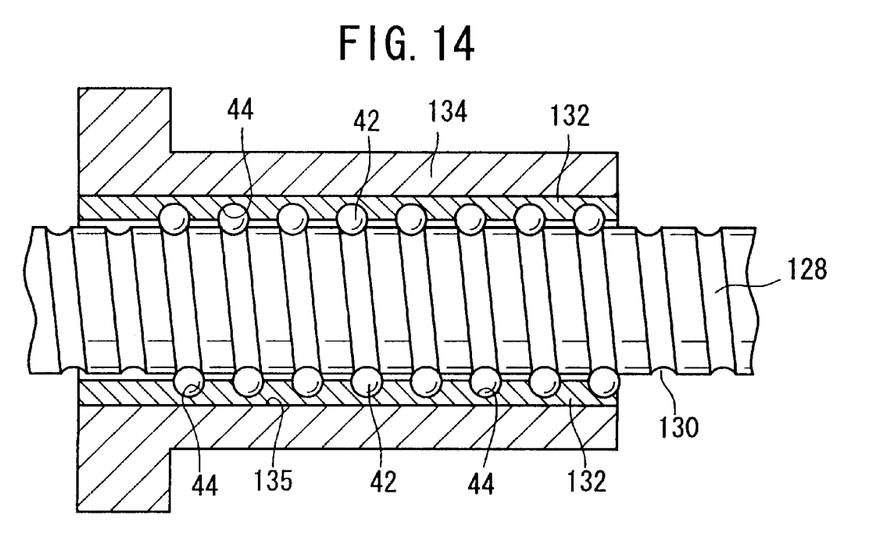
FIG. 14 is, with partial omission, a vertical sectional view taken in the axial direction of FIG. 13.

Alternatively, as shown in FIGS. 13 and 14, a guide plate 132 for rotatably retaining balls 42 may be used. The guide plates 132 may be installed to recesses 135 which are formed on the inner wall surface of a cylindrical section of a feed screw nut 134. The guide plates 132 may be circumferentially separated from each other by predetermined angles. End plates 136 are installed respectively to both axial ends of the feed screw nut 134.

When the non-circulating system, in which the balls 42 rotate, is adopted, the surface roughness of the inner surface of the dimple can be roughened, for example, by selecting a lubricating oil which is of 2000 to 20000 cSt as the viscosity of the lubricating oil and which successfully forms an oil film having a predetermined thickness in accordance with the EHL (Elastohydrodynamic Lubrication) theory. However, when the surface roughness is enhanced, a lubricating oil having a low viscosity can be also used.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A direct drive bearing mechanism having a linear member and a displacement member for making relative linear displacement in which any one of said linear member and said displacement member supports the other, said direct drive bearing mechanism comprising:

a guide plate which is provided for any one of said linear member and said displacement member and which has a plurality of substantially hemispherical dimples;

a race member which is provided for any one of said linear member and said displacement member so that said race member is opposite to said guide plate and which has a groove; and a plurality of balls which rotate in said dimples of said guide plate when said linear member and said displacement member make relative displacement and which slide along said groove of said race member so that said plurality of balls do not circulate.

2. The direct drive bearing mechanism according to claim 1, wherein said guide plate is installed to a retaining recess which is formed on an inner wall surface of a side of said displacement member, and said race member is installed to a long groove which is formed on said linear member.

3. The direct drive bearing mechanism according to claim 1, wherein said guide plate includes a pair of guide plates which are arranged substantially horizontally on said displacement member, and another pair of guide plates which are arranged along inclined surfaces of sides of said displacement member.

4. The direct drive bearing mechanism according to claim 1, further comprising a screw member which has a hemispherical dimple formed at an end, wherein said ball is rotatably supported in said dimple which is formed at said end of said screw member.

5. The direct drive bearing mechanism according to claim 4, wherein a spacing distance between said guide plate and said race member with said ball intervening therebetween is adjusted by a screwing amount of said screw member.

6. The direct drive bearing mechanism according to claim 4, wherein said screw members are screwed into a plurality of screw holes separated from each other by predetermined angles in a circumferential direction of a feed screw nut.

7. The direct drive bearing mechanism according to claim 4, wherein said screw members are screwed into a plurality of screw holes axially extending on a side of said displacement member.

8. The direct drive bearing mechanism according to claim 1, wherein said linear member is a guide rail, and said displacement member is a guide block.

9. The direct drive bearing mechanism according to claim 1, wherein a plurality of guide plates, in which said balls are rotatably retained in said respective dimples, are arranged and separated from each other by predetermined angles circumferentially on an inner wall surface of a feed screw nut.

* * * * *